US009619629B2

(12) United States Patent
Lakamp et al.

(10) Patent No.: US 9,619,629 B2
(45) Date of Patent: Apr. 11, 2017

(54) METHOD FOR GENERATING A SECURE COPY OF MEDIA DATA

(71) Applicants: Sony Corporation, Tokyo (JP); Sony Pictures Entertainment Inc, Culver City, CA (US)

(72) Inventors: Brian D. Lakamp, Malibu, CA (US); Mitchell F. Singer, Los Angeles, CA (US)

(73) Assignees: Sony Corporation, Tokyo (JP); Sony Pictures Entertainment Inc, Culver City, CA (US)

( * ) Notice: Subject to any disclaimer, the term of this patent is extended or adjusted under 35 U.S.C. 154(b) by 623 days.

(21) Appl. No.: 14/029,648

(22) Filed: Sep. 17, 2013

(65) Prior Publication Data

US 2014/0026227 A1     Jan. 23, 2014

Related U.S. Application Data

(63) Continuation of application No. 11/120,674, filed on May 2, 2005, now Pat. No. 8,538,888.
(Continued)

(51) Int. Cl.
*G06F 21/00*     (2013.01)
*G06F 21/10*     (2013.01)
(Continued)

(52) U.S. Cl.
CPC ............ *G06F 21/10* (2013.01); *G06Q 90/00* (2013.01); *G11B 20/00086* (2013.01);
(Continued)

(58) Field of Classification Search
USPC .......... 705/16, 21, 59, 71; 380/44, 262, 278, 380/279
See application file for complete search history.

(56) References Cited

U.S. PATENT DOCUMENTS 705,414 A     7/1902    Love
5,103,476 A     4/1992    Waite et al.
(Continued)

FOREIGN PATENT DOCUMENTS

JP         11194987 A     7/1999
JP        2002198957 A     7/2002

OTHER PUBLICATIONS

Notice of Preliminary Rejection issued in Korean Patent Application No. 10-2007-7006067 on Jun. 2, 2009.
(Continued)

*Primary Examiner* — Dante Ravetti
(74) *Attorney, Agent, or Firm* — Procopio, Cory, Hargreaves & Savitch LLP

(57) ABSTRACT

A system for transferring verified media data. The system comprising: an item of content storing the media data, and having an associated serial number; a computing device including a first storage device and a network interface; a secure copying application program; a secure copy of the media data generated by the secure copying application program and stored on the first storage device; a verification server including a serial number database and having a network connection to the computing device through the network interface, wherein the secure copying application program generates the secure copy after verifying the serial number is valid and active by communicating with the verification server; and a portable copy of the media data, including license information, generated from the secure copy by the secure copying application program.

14 Claims, 3 Drawing Sheets

Related U.S. Application Data

(60) Provisional application No. 60/667,330, filed on Mar. 31, 2005.

(51) Int. Cl.
*G06Q 90/00* (2006.01)
*G11B 20/00* (2006.01)

(52) U.S. Cl.
CPC .. *G11B 20/00115* (2013.01); *G11B 20/00688* (2013.01); *G11B 20/00862* (2013.01)

(56) References Cited

U.S. PATENT DOCUMENTS

| | | |
|---|---|---|
| 5,699,527 A | 12/1997 | Davidson |
| 5,805,699 A | 9/1998 | Akiyama et al. |
| 5,926,624 A | 7/1999 | Katz et al. |
| 6,158,005 A | 12/2000 | Bharathan et al. |
| 6,453,420 B1 | 9/2002 | Collart |
| 6,665,303 B1 * | 12/2003 | Saito .................. H04L 12/2803 370/353 |
| 6,691,229 B1 * | 2/2004 | Nelson .................... G06F 21/16 713/168 |
| 6,697,944 B1 | 2/2004 | Jones et al. |
| 6,782,190 B1 | 8/2004 | Morito |
| 7,039,801 B2 | 5/2006 | Narin |
| 7,058,414 B1 * | 6/2006 | Rofheart ................. G01S 7/023 455/411 |
| 7,073,063 B2 | 7/2006 | Peinado |
| 7,203,966 B2 | 4/2007 | Abburi et al. |
| 7,346,687 B2 | 3/2008 | Lipscomb et al. |
| 7,376,840 B2 | 5/2008 | McCann et al. |
| 7,421,411 B2 | 9/2008 | Kontio et al. |
| 7,483,958 B1 | 1/2009 | Elabbady et al. |
| 7,484,103 B2 | 1/2009 | Woo et al. |
| 2002/0029347 A1 | 3/2002 | Edelman |
| 2002/0069420 A1 | 6/2002 | Russell et al. |
| 2002/0073229 A1 * | 6/2002 | Hayashi .............. H04L 63/0442 709/237 |
| 2002/0094207 A1 | 7/2002 | Richards et al. |
| 2002/0157002 A1 | 10/2002 | Messerges et al. |
| 2002/0160931 A1 | 10/2002 | Lenselink et al. |
| 2003/0167392 A1 | 9/2003 | Fransdonk |
| 2003/0187801 A1 | 10/2003 | Chase et al. |
| 2003/0191719 A1 * | 10/2003 | Ginter ................ H04N 21/8358 705/54 |
| 2003/0198351 A1 | 10/2003 | Foster et al. |
| 2004/0054779 A1 * | 3/2004 | Takeshima ........ G06F 17/30569 709/225 |
| 2004/0117483 A1 | 6/2004 | Singer et al. |
| 2004/0117628 A1 | 6/2004 | Colvin |
| 2004/0117663 A1 | 6/2004 | Colvin |
| 2004/0143736 A1 * | 7/2004 | Cross ................ G06F 17/30067 713/165 |
| 2004/0168184 A1 * | 8/2004 | Steenkamp ............ H04N 7/163 725/31 |
| 2004/0202492 A1 * | 10/2004 | Kuboki .............. H04N 1/00013 399/82 |
| 2004/0218900 A1 | 11/2004 | Yoon et al. |
| 2005/0071375 A1 | 3/2005 | Houghton et al. |
| 2005/0125355 A1 | 6/2005 | Fein |
| 2005/0131832 A1 * | 6/2005 | Fransdonk .............. G06F 21/10 705/59 |
| 2005/0273608 A1 | 12/2005 | Kamperman |
| 2005/0289169 A1 | 12/2005 | Adya et al. |
| 2006/0085349 A1 | 4/2006 | Hug |
| 2007/0112948 A1 | 5/2007 | Uhlik |

OTHER PUBLICATIONS

Notice of Preliminary Rejection issued in Korean Patent Application No. 10-2007-7006070 on Jun. 2, 2009.
Notice of Preliminary Rejection issued in Korean Patent Application No. 10-2007-7006072 on Jun. 1, 2009.
Korean Patent Application Publication No. 2002-0029657 published on Apr. 19, 2002.
Notice of Preliminary Rejection issued in Korean Patent Application No. 10-2007-7006071 on May 26, 2009.
Official Action issued in Japanese Patent Application No. 2005-502636 on Aug. 3, 2009.
Japanese Patent Application No. 2002-308406 (JP 2004-5365A) published on Jan. 8, 2004.

* cited by examiner

METHOD FOR GENERATING A SECURE COPY OF MEDIA DATA

CROSS-REFERENCE TO RELATED APPLICATIONS

The present application is a continuation application of U.S. patent application Ser. No. 11/120,674, filed May 2, 2005 (now U.S. Pat. No. 8,538,888), which claimed the benefit of priority of U.S. Provisional Patent Application No. 60/667,330, filed Mar. 31, 2005. The disclosures of the above-referenced applications are incorporated herein by reference.

BACKGROUND

Since digital media such as video DVDs and audio CDs allow perfect reproduction of digital data stored on them, there is a need for sophisticated copy protection systems to prevent extensive piracy. Without any form of copy control, films, audio recordings, and other digital content distributed on DVD disk or CD-ROM can be easily recorded by a digital recorder onto a digital data storage medium such as a recordable DVD disk, from which they can be further copied numerous times onto other DVD disks, without any degradation in the copy quality.

To prevent unauthorized copying, devices sold to consumers incorporate copy protection mechanisms. For example, copy protection information can be embedded in the data sector of a DVD disk. A possible method of copy control using such embedded information is for the digital content provider to supply the film or other digital content on a read-only medium, for example a DVD-ROM disk, with a flag that prevents copying embedded in the data. The DVD player/recorder will check for the presence of this flag and, if an attempt is made to copy the disk when the flag is present, the recording circuitry will prevent recording. However, this type of protection can be circumvented by using DVD-ROM/RAM drives as peripherals for computers, so as to enable copying of the data from an original disk onto a recordable disk on a bit-by-bit basis, including the copy protection information.

To prevent such bypassing of the protection scheme, some DVD players are designed to check for the presence of "Do Not Copy" flags on recordable disks as opposed to ROM disks. The presence of such a flag on a recordable disk is taken to indicate that the disk is an unauthorized copy of an original ROM disk, so that playback of the data on the disk will be prevented. Otherwise, if the player detects that a ROM disk is being used, it will play back the data on the disk.

However, this scheme works on the premise that a computer user copying the disk will copy all of the data on a bit-by-bit basis, including the "Do Not Copy" flag. The scheme can still be easily bypassed by the computer user who knows or determines where the copy control information is located on an original ROM disk, and who can therefore change or overwrite this information when making a copy of the original disk onto a recordable disk.

A further problem with the above-described protection scheme is that it is inflexible, with no way of providing for a copy management system, which governs the extent to which copying is permitted. For example, there is no way of providing for the contents of an original data storage medium to be copied to a backup medium, while preventing the production of a further generation of copies from the backup medium.

SUMMARY

The present invention provides systems, methods, and programs for transferring verified media data.

In one implementation, a system for transferring verified media data comprises: an item of content storing the media data, and having an associated serial number; a computing device including a first storage device and a network interface; a secure copying application program; a secure copy of the media data generated by the secure copying application program and stored on the first storage device; a verification server including a serial number database and having a network connection to the computing device through the network interface, wherein the secure copying application program generates the secure copy after verifying the serial number is valid and active by communicating with the verification server; and a portable copy of the media data, including license information, generated from the secure copy by the secure copying application program.

In another implementation, a method for transferring verified media data comprises: receiving said media data on an item of content into a computing device; receiving a serial number associated with said item of content; requesting verification of said serial number; receiving a confirmation of said verification indicating that said serial number is valid and active; generating a secure copy of said media data; generating a portable copy of said media data from said secure copy, said portable copy including license information of said media data; and storing said portable copy in a portable media player device.

In another implementation, A computer program, stored on a tangible storage medium, for use in transferring verified media data, comprises executable instructions that cause a computer to: receive said media data on an item of content into a computing device; receive a serial number associated with said item of content; request verification of said serial number; receive a confirmation of said verification indicating that said serial number is valid and active; generate a secure copy of said media data; and generate a portable copy of said media data from said secure copy, said portable copy including license information of said media data, wherein said portable copy is transferred to a portable media player device so that the portable media player device can process said portable copy according to said license information.

DETAILED DESCRIPTION

The present invention provides systems, methods, and programs for transferring verified media data.

In one implementation, the media data is copied from an item of content (e.g. a digital video disk), which is associated with a serial number, to a computing device. If the serial number is verified as being valid and active, a secure copy of the media data is generated and stored on the computing device. Portable copies of the media data can then be generated from the secure copy. Each portable copy includes license information of the media data. The portable copy is stored and played on a portable media player device according to the license information.

Several illustrative examples of implementations are presented below. These examples are not exhaustive and additional examples and variations are also described later.

Figure 1:
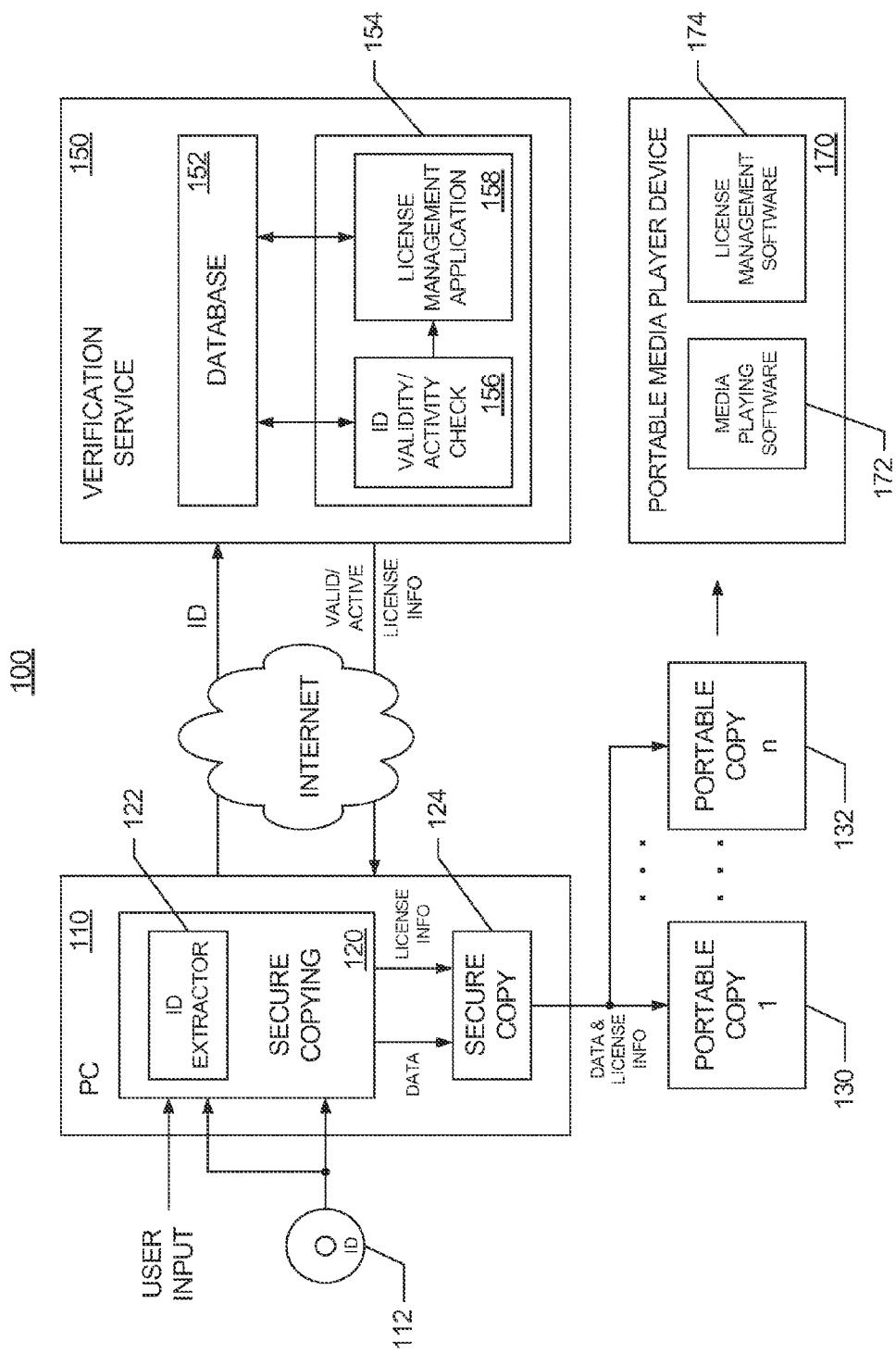
FIG. 1 shows a media transfer system that enables consumers to purchase an item of content, such as a recording medium, and to make portable copies from that medium subject to verification by the system.

FIG. 1 shows a media transfer system 100 that enables consumers to purchase an item of content, such as a recording medium 112, and to make portable copies 130, 132 from that medium 112 subject to verification by the system 100. The recording medium 112 can store media data as encoded and/or encrypted data. The media transfer system 100 uses a serial number (ID) associated with the medium 112, secure copying software 120, a verification service 150, and license management software 174.

In some implementations, the item of content 112 includes a tangible storage medium, such as a digital video disk (DVD) or an optical disk, which stores the media data. The media data stored on the tangible storage medium may include a movie or a song. In other implementations, the item of content 112 includes a channel in which the media data can be streamed or downloaded to destination(s).

The media producer produces a recording medium 112 storing media data and embeds in the data an algorithmically unique serial number (e.g., as Universal Unique Identifier (UUID)). Other techniques for providing the serial number, such as attaching the serial number to the package of the recording medium 112, can also be used. The serial number may also be cryptographically constructed using public key cryptography or other techniques such that the validity of the serial number can be verified algorithmically. The serial number may also be attached to the recording medium or packaging using electronic mechanisms such as RFID, bar codes, or magnetic codes which may be read by the player devices in a different manner than the media content. The serial number includes a number that is non-sequential relative to the numbers of other products of a media company. Typically, the media company includes a media content provider.

A consumer purchases the recording medium 112 and inserts the medium into a computing device, such as a personal computer (PC) 110. The consumer inserts the recording medium 112 into the PC 110 and runs a secure copying application program 120, which requests the secure copying program 120 to make a secure copy 124 of the media stored on the recording medium 112. The secure copying program 120 is provided by the media company, an affiliate or an approved technology vendor. An ID extractor 122 in the secure copying program 120 reads the serial number from the recording medium 112 or requests that the user manually input the serial number, if it is not embedded in the medium 112. After retrieving the serial number, the program 120 contacts a verification service 150. In one implementation, access to the verification service 150 is made through the Internet. In other implementations, other access means such as a telephone, can also be used to access the verification service 150 from the computing device 110. If the serial number is not available, the secure copying program 120 informs the consumer that the transaction has failed.

In one example, the verification service 150 is a third party service that receives a request and validates the serial number against a database of valid serial numbers. In another example, the verification service 150 is a service performed by the media company, an affiliate, or an approved vendor.

The verification service 150 includes a network server 154 and a database 152 of serial numbers. The network server 154 includes an ID validity/activity check 156 and a license management application 158 (e.g., as software application programs). The media company provides information to the verification service 150 to indicate which serial numbers are valid. Alternatively, the serial numbers may be cryptographically constructed so that the server can independently determine if the serial numbers are valid. When the secure copying program 120 and the verification service 150 have established a communication session, the secure copying program 120 sends the serial number read from the recording medium 112 to the verification service 150. The ID validity/activity check 156 of the verification service 150 checks the serial number database 152 to determine if the serial number from the secure copying program 120 is valid and if the serial number is still active. The verification service 150 sends a message back to the secure copying program 120 indicating the serial number is valid/active, or invalid. The license management application 158 of the verification service 150 determines and transmits to the computing device 110 license information based on the serial number. Typically, the license information indicates limitations on the use of a portable copy of the media such as an expiration period for the portable copy. Alternatively, the license information can be retrieved from the recording medium, similar to the retrieval process of the serial number.

If the message indicates the serial number is valid/active, the secure copying program 120 makes a secure copy 124 (e.g., encrypted) of the media stored on the recording medium 112 and stores the secure copy 124 on the hard disk of the requesting computing device 110. The license information is also inserted into the secure copy. If the message from the verification service 150 indicates that the serial number is not valid, the secure copying program 120 does not make a copy and informs the consumer that the transaction has failed.

After making the secure copy 124, the consumer may be authorized by the service 150 to make additional portable copies 130, 132 of the secure copy 124. A portable copy 130 or 132 is configured to be viewed on some device other than the device 110 that is storing the secure copy 124. The consumer connects a portable media player device 170 (e.g., a laptop computer or MP3 player) to the computing device 110 that is storing the secure copy 124 and runs the secure copying program 120. The consumer requests that the secure copying program 120 make a portable copy 130 or 132 of the media data and transfer the portable copy 130 or 132 to the portable media player device 170. The secure copying program 120 creates a portable copy 130 or 132 from the secure copy 124 and includes the license information received from the verification service 150 in the portable copy 130 or 132. The license information is provided by the media company and indicates limitations on the use of the portable copy 130 or 132. The consumer disconnects the portable media player device 170 and can play and view the media from the portable copy 130 or 132 using the portable media player device 170.

In some implementations, the portable copy 130 or 132 is copied and stored directly onto the portable media player device 170, such as a portable DVD player. In other implementations, the portable copy 130 or 132 is copied and stored onto a tangible portable recording medium, such as a DVD or an optical disk. The portable copy 130 or 132 on the tangible portable recording medium can be subsequently loaded onto the portable media player device 170 to be played according to the license information.

In one example, the secure copying program 120 is provided by digital rights management (DRM) of the media player on the computing device 110. In another example, the secure copying program 120 is provided by digital rights management (DRM) of the media player on the portable media player device 170.

The license information included in each portable copy 130 or 132 can be different from the other copies. For example, the secure copying program may generate different license information so that after a particular number of portable copies, the expiration period is made shorter. In a particular example, the license information on first three portable copies can be set to expire after 30 days of playing, while subsequent portable copies are set to expire after 10 days.

The portable media player device 170 includes a media playing software 172 and a license management software 174. The license management software 174 uses the license information of the portable copy 130 or 132 to determine how the portable copy can be used.

In one example, at the end of the expiration period, the media playing software 172 of the portable media player device 170 will no longer play the media of the portable copy 130 or 132. The expiration period can be reset by reconnecting the portable media player device 170 storing the portable copy 130 or 132 to the computing device 110 storing the secure copy 124. When the portable media player device 170 is reconnected and the user makes an appropriate request, the secure copying program 120 updates the license information of the portable copy 130 or 132 to reset or extend the expiration period. The consumer disconnects the portable media player device 170 and can again play and view the media from the refreshed portable copy 130 or 132.

Alternatively, the expiration period can be reset by connecting the portable media player device 170 to the computing device 110 through a network connection. The secure copying program 120 can then update the license information of the portable copy 130 or 132 through the network connection.

In this example, the consumer can make a portable copy 130 or 132 of the media from the purchased recording medium 112 so that the medium 112 can be played and viewed on the consumer's portable device 170. This flexibility is convenient for the consumer. At the same time, the consumer can only make a portable copy 130 or 132 from the secure copy 124 that is created subject to verification of the serial number provided with the purchased recording medium 112. In addition, the use of the portable copy 130 or 132 is limited through the license information of the portable copy 130 or 132. This security allows the media company producing the recording medium 112 to maintain control over the copying process and use of the media data stored on the recording medium 112.

Figure 2A:
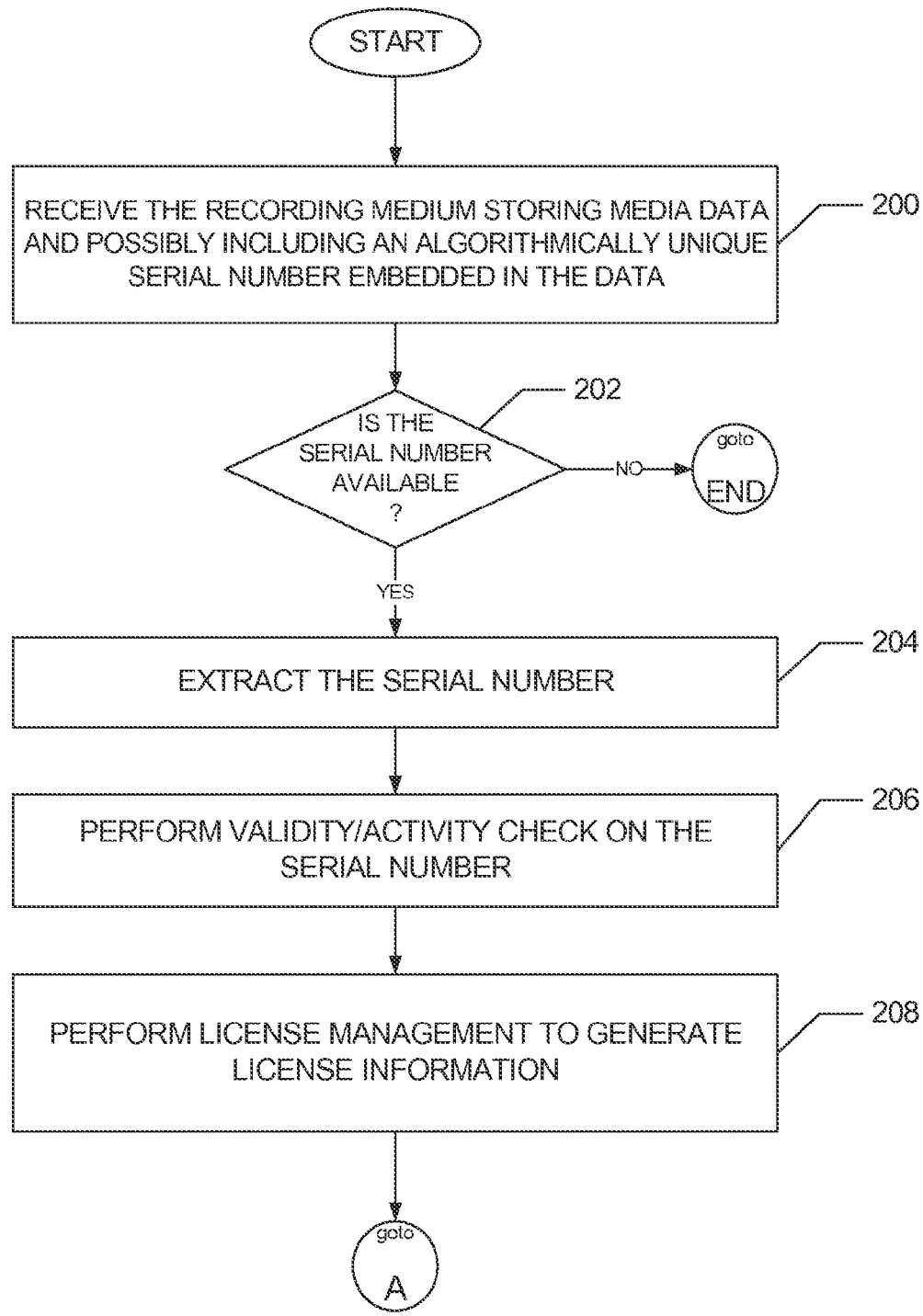
FIGS. 2A and 2B is a flowchart showing a media transfer method that enables consumers to purchase a recording medium, to make portable copies from that medium subject to verification, and to process and play the portable copies according to license information.
Figure 2B:
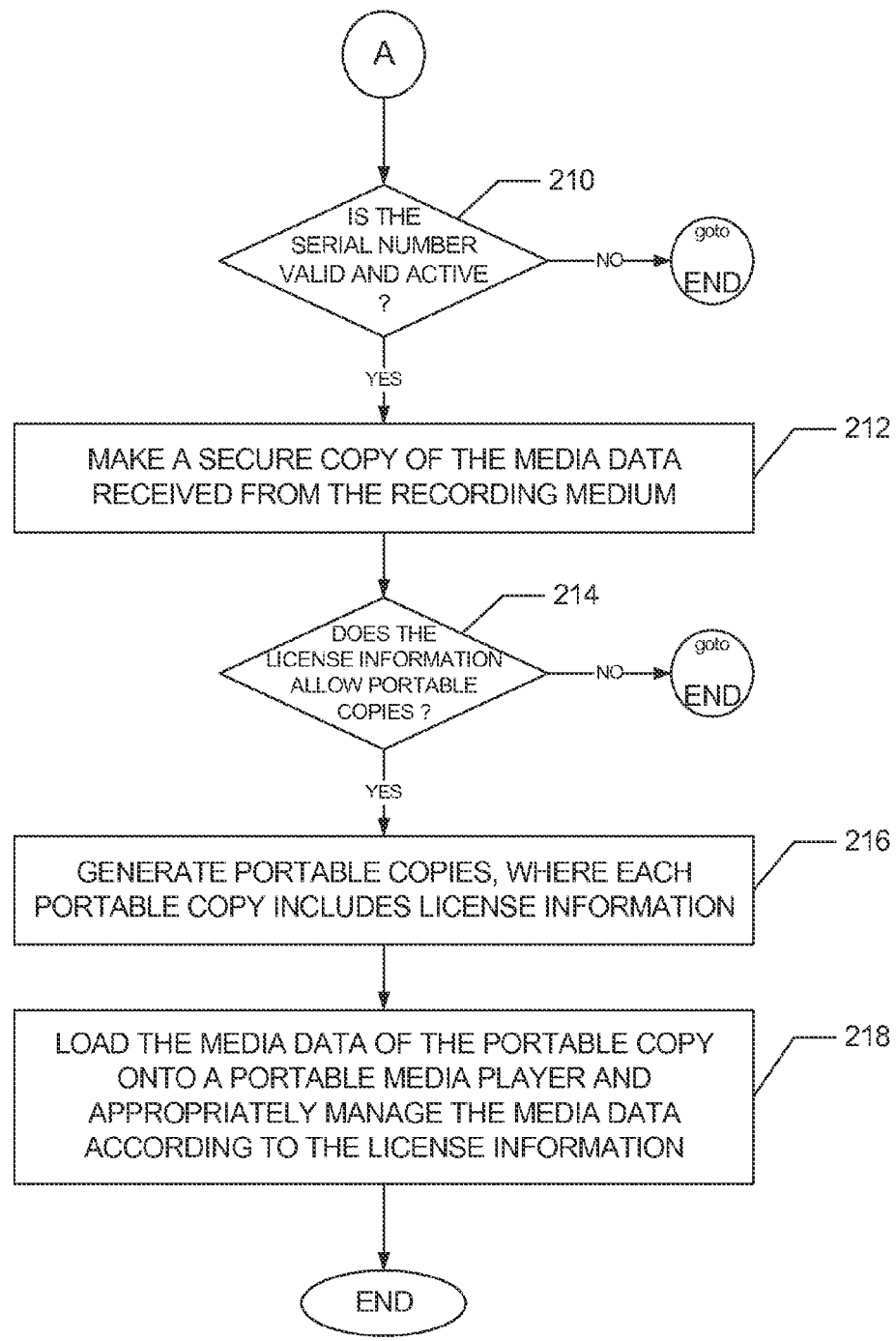

FIGS. 2A and 2B show a secure media transfer method illustrated as a flowchart. The method enables consumers to purchase a recording medium 112 and to make portable copies 130, 132 from that medium subject to verification. The method also enables consumers to process and play the portable copies 130, 132 according to the license information.

Typically, the media company produces the recording medium 112 storing media as encoded and encrypted data. The consumer purchases the recording medium 112 and inserts the medium into the computing device 110.

The computing device 110 receives, at 200, the recording medium 112 storing the media data and possibly including an algorithmically unique serial number embedded in the data. If the serial number is not embedded in the data, then the number can be manually entered by the user.

At 202, a determination is made whether the serial number is available (either embedded in the data or manually entered by the user). If the serial number is determined to be available, the serial number is extracted, at 204, and a validity/activity check is performed on the serial number, at 206. License management is performed, at 208, to generate license information. If it is determined, at 210, that the serial number is valid and active, then a secure copy 124 of the media data received from the recording medium 112 is made, at 212.

A determination is then made, at 214, whether the license information allows portable copies 130, 132 to be made. If the license information allows portable copies 130, 132 to be made, then the portable copies are generated, at 216, and each portable copy 130 or 132 includes the license information. The media data of the portable copy 130 or 132 is loaded onto a portable media player device 170, at 218, and appropriately managed according to the license information.

The various implementations of the invention are realized in electronic hardware, computer software, or combinations of these technologies. Some implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementation using the license information as limitations/restrictions on the use of the portable copy, such as an expiration period, other types of license information, such as scope and characteristics of the use, can also be implemented. Further, while the examples of the media data in the above description include music and video, other data, such as software application can also be used.

Accordingly, the present invention is not limited to only those implementations described above.

What is claimed is:

1. A method for transferring media data stored in an item of content using a computing device, the method comprising:

receiving, by the computing device, the item of content; wherein the item of content includes the media data and a serial number associated with the media data;

extracting, by the computing device, the media data and a serial number associated with the media data from the received item of content;

storing, by the computing device, the extracted media data;

receiving, by the computing device, an indication that the associated serial number with the received media data has been determined to be valid and in active status;

generating, by the computing device, a secure copy of the received media data;

receiving, by the computing device, license information based on the associated serial number determined to be valid and in active status;

generating, by the computing device, a portable copy of the media data including the received license information of the media data using the generated secure copy of the media data: and transferring, by the computing device, the generated portable copy of the media data including the received license information of the media data to a portable device.

2. The method of claim 1, wherein the media data is stored on an-the item of content which includes a digital video disk (DVD).

3. The method of claim 1, wherein the license information includes limitations on the use of the portable copy of the media data.

4. The method of claim 3, wherein the limitations are modified for the portable copy made after a certain number of copies of the portable copy is made.

5. The method of claim 3, further comprising resetting the limitations on the use of the portable copy by connecting the portable device to the computing device.

6. The method of claim 1, further comprising storing a license management program on the portable device to process and control access to the portable copy of the media data on the portable copy device according to the license information.

7. The method of claim 1, wherein the portable device includes a laptop computer.

8. The method of claim 1, wherein the portable device includes an MP3 player.

9. A non-transitory tangible storage medium storing a computer program, to transfer media data stored in an item of content using a computing device, the computer program comprising executable instructions when executed by a processor, causes the processor to perform the steps of:

receiving the item of content;

wherein the item of content includes the media data and a serial number associated with the media data;

extracting the media data and a serial number associated with the media data from the received item of content;

receiving the extracted media data;

receiving an indication that the associated serial number with the received media data has been determined to be valid and in active status;

generating a secure copy of the received media data;

receiving, license information based on the associated serial number determined to be valid and in active status;

generating a portable copy of the media data including the received license information of the media data using the generated secure copy of the media data: and transferring the generated portable copy of the media data including the received license information of the media data to a portable device.

10. The non-transitory tangible storage medium of claim 9, wherein the media data is stored on an-the item of content which includes a digital video disk (DVD).

11. The non-transitory tangible storage medium of claim 9, wherein the license information includes limitations on the use of the portable copy of the media data.

12. The non-transitory tangible storage medium of claim 11, wherein the limitations are modified for the portable copy made after a certain number of copies of the portable copy is made.

13. The non-transitory tangible storage medium of claim 11, further comprising the step of:

resetting the limitations on the use of the portable copy by connecting the portable device to the computing device.

14. The non-transitory tangible storage medium of claim 9, further comprising the step of:

storing a license management program on the portable device to process and control access to the portable copy of the media data on the portable copy device according to the license information.

* * * * *